US008101048B2

(12) United States Patent
Lipiecki et al.

(10) Patent No.: US 8,101,048 B2
(45) Date of Patent: Jan. 24, 2012

(54) PURIFICATION PROCESS USING MICROCHANNEL DEVICES

(75) Inventors: Francis Joseph Lipiecki, Haddonfield, NJ (US); Stephen G Maroldo, Ambler, PA (US); Deodatta Vinayak Shenai-Khatkhate, Danvers, MA (US); Robert A. Ware, Wellesley, MA (US)

(73) Assignee: Rohm and Haas Company, Philadelphia, PA (US)

( * ) Notice: Subject to any disclaimer, the term of this patent is extended or adjusted under 35 U.S.C. 154(b) by 694 days.

(21) Appl. No.: 12/215,827

(22) Filed: Jun. 30, 2008

(65) Prior Publication Data

US 2009/0020010 A1 Jan. 22, 2009

Related U.S. Application Data

(60) Provisional application No. 60/961,370, filed on Jul. 20, 2007, provisional application No. 61/065,473, filed on Feb. 12, 2008.

(51) Int. Cl.
*B01D 3/00* (2006.01)

(52) U.S. Cl. .................. 203/39; 62/620; 95/90; 95/114; 203/12; 203/99; 556/400

(58) Field of Classification Search .................... 62/620; 95/90, 114; 203/12, 39, 99; 556/400
See application file for complete search history.

(56) References Cited

U.S. PATENT DOCUMENTS

| | | | | |
|---|---|---|---|---|
| 3,642,447 | A * | 2/1972 | Hahn et al. | 423/503 |
| 5,874,603 | A * | 2/1999 | Arkles | 556/465 |
| 6,652,627 | B1 | 11/2003 | Tonkovich et al. | |
| 6,666,909 | B1 | 12/2003 | TeGrotenhuis et al. | |
| 6,746,515 | B2 | 6/2004 | Wegeng et al. | |
| 6,814,781 | B2 | 11/2004 | Tonkovich et al. | |
| 6,875,247 | B2 | 4/2005 | TeGrotenhuis et al. | |
| 7,659,414 | B2 * | 2/2010 | Lipiecki et al. | 556/1 |
| 7,919,638 | B2 * | 4/2011 | Lipiecki et al. | 556/1 |
| 7,939,684 | B2 * | 5/2011 | Lipiecki et al. | 556/35 |
| 2006/0016215 | A1 | 1/2006 | Tonkovich et al. | |
| 2006/0016216 | A1 | 1/2006 | Tonkovich et al. | |
| 2006/0142401 | A1 | 6/2006 | Tonkovich et al. | |

FOREIGN PATENT DOCUMENTS

WO WO2007032810 3/2007

OTHER PUBLICATIONS

K. Kochmann, "Separation Principles in Micro Process Engineering," Unpushlished paper, IMTEK, 2005 AlChE Spring Meeting, Atlanta, GA, Apr. 10-14, Session 129-Unit Operations.

X. Huang, "Hydrodusulfurization of JP-8 Fuel and Its Microchannel Distillate Using Steam Reformate," ScienceDirect, Catalyst Today 136 (2008) 291-300.

* cited by examiner

*Primary Examiner* — Jason M Greene
*Assistant Examiner* — Anthony Shumate
(74) *Attorney, Agent, or Firm* — Tifani M. Cottingham

(57) ABSTRACT

This invention relates to methods of removing impurities from compounds having similar volatilities to form ultra high purity compounds.

9 Claims, No Drawings

PURIFICATION PROCESS USING MICROCHANNEL DEVICES

This application claims the benefit of priority under 35 U.S.C. §119(e) of U.S. Provisional Patent Application No. 60/961,370 filed on Jul. 20, 2007 and U.S. Provisional Patent Application No. 61,065,473 filed on Feb. 12, 2008.

This invention relates to methods of removing impurities from compounds having a relative volatility equal to or less than 1.2, to form ultra high purity compounds.

There are many unmet needs for ultra high purity compounds for use as feeds, intermediates, solvents or final products in materials processing and applications. As used herein, ultra high purity is defined as purity ranging from lower limits of $10^{-10}$ wt % (1 ppt) to upper limits of 0.01 wt % (100 ppm). These compounds include but are not limited to distillable organics, including monomers, solvents for chromatographic applications such as HPLC, sublimable solids, electronic chemicals, and analytical reagents.

Traditional methods to purify compounds include distillation, crystallization, extraction, absorption, adduct purification, mass-selective ultracentrifuge, and chemical treatment combined with distillation. These methods and other related methods, such as the distillation method disclosed in US Patent Publication No. US 2006/0016215A1 are often limiting because of the close boiling nature or low relative volatility of the desired compound and impurity(s), and the low impurity concentration and driving force for mass transfer. Compounds with a low relative volatility, $\alpha$, ($\alpha$=vapor pressure of impurity/vapor pressure of desired compound) equal to or less than 1.2 are especially difficult to purify by staged processes employing vapor/liquid equilibrium thereby making ultra high purity materials unattainable by the conventional methods. Furthermore, there is often an economic constraint to the purity levels attainable with existing methods. Excessive capital or operating costs can limit the attainable purity due to unacceptable yield loss, energy input, or process cycle time due to the physical and/or chemical properties of the impurities and the compound.

For example, it is possible to estimate the minimum number of equilibrium stages required for distillation based on the relative volatility ($\alpha$) of the components and the desired purity using the Fenske Equation. To remove the most problematic, near boiling impurities ($\alpha<1.2$), the number of stages, or height equivalent theoretical plates (HETP), can exceed 50, 100, or even 200 which can require a column height of >10 meters even with today's most advanced packings (HETP=0.05 to 0.20 m). A column of this size poses difficult scale-up and operability challenges and safety concerns from the large inventory of compounds for many applications.

Accordingly, there is an ongoing need for a more economical and efficient process for purifying compounds having impurities with a relative volatility equal to or less than 1.2.

The present invention meets this foregoing need by drawing upon the benefits of microchannel devices in combination with known techniques for purification. Microchannel devices provide better control of process conditions, improved safety, and speed to market from laboratory development to commercial manufacturing. These devices are extremely useful for purification of reagents, solvents, intermediates, or final products. The basis for the observed benefits provided by microchannel technology arises from the small dimensions and high surface area provided in the device which enables high exchange rates between phases. Enhancement of purification is achieved in the microchannel architecture dimensions, typically 1 to 1000 microns, through an increased importance of capillary and interfacial phenomena, and reduced distances for heat and mass-transfer. The superior heat and mass transfer in these devices provides high exchange rates between phases and better temperature control for more efficient purification stages or lower height equivalent theoretical plate (HETP), thus enabling more stages for higher purity in a fixed purification device geometry. Furthermore, there are benefits in lower capital intensity and lower operating costs through improved energy efficiency by better integration of heat exchange. The microchannel device further enables production scale-up by "numbering-up" or merely duplicating the single channel many times, rather than conventional scale-up, which increases the size of reactor vessels as scale increases, to meet market demand with no performance loss and at significant time and cost savings without the need for traditional process scale-up studies.

In the present invention there is provided a method for preparing compounds of ultra high purity comprising:

separating at least one target compound from at least one impurity compound in at least one microchannel device; wherein the at least one target compound and at least on impurity compound have a relative volatility of equal to or less than 1.2; and further wherein the at least one target compound has a resultant purity of 99.99%.

As used herein, by "microchannel device" is meant a microstructured device (generally, but not exclusively) with three-dimensional structures (channels or spaces for fluid flow), with dimensions perpendicular to flow which are typically 0.1 to 5,000 micrometers, and more specifically between 10-1,000 micrometers There are a variety of fabrication techniques and materials of construction for the microchannel devices of the present invention. Some materials of construction include but are not limited to metals, polymers, silicon, ceramics, and glass. Table 1 below, illustrates some of the available fabrication techniques for each type of microchannel devices:

TABLE 1

| Metals | Polymers | Silicon | Ceramics | Glass |
|---|---|---|---|---|
| Mechanical micromachining | Molding | Lithography | Ceramic injection molding | Isotropic etching |
| Laser micromachining | Injection molding | Anisotropic dry etching | Tape casting | Microstructuring of photoetchable glass |
| Wet Chemical Etching | Hot embossing | Deep reactive ion etching | Stereolithography | Laser patterning |
| Selective Laser Melting | Polymer laser micromaching | Anisotropic wet etching | Coatings and foams | |
| Shims | Microstereolithography | Isotropic etching | | |

Optionally, the microchannel device of the present invention contains a wick structure. The wick structure helps to increase interfacial exchange area and maintain the liquid and vapor phases in discrete regions of the device to minimize backmixing which degrades performance. The wick structure can be any type currently known to those of skill in the art. The microchannel devices of the present invention may have a HETP ranging from less than 5 cm to less than 0.25 cm. In some cases the HETP of the microchannel device is less than 0.05 cm.

Microchannel devices as aforementioned are useful because they increase heat and mass transfer. Heat and mass transfer are increased by the configuration or way in which the microchannel devices are constructed and operated. Smooth channel walls aid in increasing heat and mass transfer. Other structural features on the channel walls such as grooving, texturing and patterning also aid to increase the heat and mass transfer of the device making the device more efficient. Any material comprising at least one target compound and at least one impurity compound having a relative volatility of equal to or less than 1.2 can be separated by feeding the sample materials through a microchannel device. As used herein, by "target compound" is any compound in which one is attempting to obtain a predetermined purity level post-purification. As used herein, by "impurity compound" is meant any material that is combined with the target compound that is intended to be separated from the target compound. In the present invention there is at least one target compound which will be separated from at least one impurity compound. It is an object of the present invention to separate at least one target compound from at least one impurity compound such that the resultant target compound has a purity of at least 99.9999%, at least 99.999%, or at least 99.99%. This level of purity can be achieved using microchannel devices alone or these devices in combination with other known purification techniques.

The microchannel device may be employed alone or in conjunction with other known purification techniques. One class of techniques is adsorptive or chemical purification such as adduct-purification by temperature swing adsorption. A selective adsorbent or adduct-forming Lewis base such as an amine, phosphine, or ether can be supported on microchannel surfaces, providing very high exchange area to contact the impurity-containing stream. Other microchannels can be provided for flow of heat transfer fluid for precise temperature control of the device to efficiently regulate and cycle between the adsorption and desorption steps. The microchannel devices may be employed in conjunction with chemical purification processes such as those employing ionic liquids as purification agents. To illustrate, metalorganic compounds are purified by mixing the impurity-containing metalorganic compounds with an ionic liquid and heating the resultant mixture followed by the separation and isolation of ultra-pure metalorganic compound. This method may be used in conjunction with a microchannel device to substantially reduce metallic, organic and organometallic impurities present in the target metalorganic compounds. This combinatorial method provides metalorganic compounds having reduced levels of silicon-containing impurities as compared to those obtained using conventional purification processes, in order to meet the stringent purity criteria (all impurities <10 ppb) required in semiconductor industry.

Ionic liquids are generally salts that are liquid at low temperatures, having melting points under 100° C. Many ionic liquids remain in liquid at room temperature, and are referred to as room temperature ionic liquids. Ionic liquids are composed entirely of ions and typically they are composed of bulky organic cations and inorganic anions. Due to the high Coulumbic forces in these compounds, ionic liquids have practically no vapor pressure.

Any suitable ionic liquid may be employed in the present invention. Exemplary cations used in ionic liquids include, but are not limited to, a hydrocarbylammonium cation, a hydrocarbylphosphonium cation, a hydrocarbylpyridinium cation, and a dihydrocarbylimidazolium cation, shown below as Types I-IV, respectively. Exemplary anions useful in the present ionic liquids include, but are not limited to, a chlorometalate anion, a fluoroborate anion such as tetrafluoroborate anion and a hydrocarbyl substituted fluoroborate anion, and a fluorophosphate anion such as hexafluorophosphate anion and a hydrocarbyl substituted fluorophosphate anion. Examples of chlorometalate anions include, but are not limited to, chloroaluminate anion such as tetrachloroaluminate anion and a chlorotrialkylaluminate anion, chlorogallate anions such as chlorotrimethylgallate and tetrachlorogallate, chloroindate anions such as tetrachloroindate and chlorotrimethylindate.

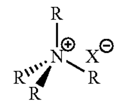

Type I: Hydrocarbyl subsitituted ammonium halide
R = a hydrocarbon group

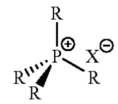

Type II: Hydrocarbyl subsitituted phosphonium halide
R = a hydrocarbon group

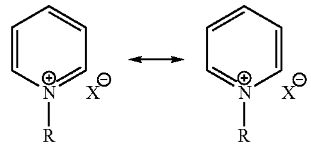

Type III Hydrocarbyl subsitituted pyridinium halide
R = a hydrocarbon group

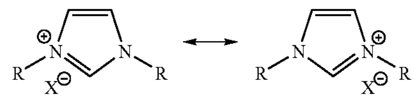

Type IV Hydrocarbyl subsitituted imidazolium halide
R = a hydrocarbon group

In the above formulae of Types I-IV, R=H, ($C_1$-$C_{10}$)alkyl such as methyl, ethyl, propyl, butyl, pentyl, hexyl and octyl; aralkyl such as benzyl; alkenyl such as allyl; aryl such as phenyl; or di($C_1$-$C_6$)alkylamino($C_1$-$C_{10}$)alkyl such as dimethylaminomethyl, dimethylaminoethyl, dimethylaminopropyl and diethylaminopropyl; and X is a halide, such as chloride. Each R group may be the same or different.

Other purification processes, such as distillation, stripping, extraction, and adsorption, based on microchannel device technology provide the enhanced heat and mass transfer required to achieve ultra high purity products (ppm, ppb, ppt). These purification processes additionally provide the intensification of transfer stages needed to solve the problem of purifying fluid mixtures with similar boiling points (relative volatility, $0.8<\alpha\leqq 1.2$) to high purity levels. Advantageous operating conditions include temperatures and pressures where one or more of the fluid components in the liquid phase is capable of undergoing a phase change either to the vapor state or to an adsorbed state on a sorbent. This can include temperatures from −25° C. to 250° C., and pressures from 0.1 Pa to 10 MPa. Feed impurity levels can range from 1 ppm up to 10 wt % or even 50 wt % of the fluid mixture.

The microchannel devices may be used to purify a variety of compounds. The impurities of the compounds of the present invention typically have relative volatility of less than 1.5 and are difficult to purify by traditional distillation methods. More preferably, the relative volatility of the impurities in the compound include $\alpha\leqq 1.2$. Distillable organics, such as monomers, find utility in the synthesis of polymers for high value applications where ultra high purity is required to meet stringent product requirements for food, drug, or human healthcare applications. These can include pharmaceutical devices for drug delivery, human healthcare diagnostics, human implantable devices, and ion exchange resins for purification/production of biological, pharmaceutical, or nutraceutical compounds. One means to achieve ultra high purity polymer products is to reduce the impurities in the starting monomers.

Other applications for high purity monomers include the production of low volatile organic content (VOC) acrylic latex paints. In particular, production of low VOC paints derived from butylacrylate requires the removal of close boiling impurities in the monomer as one means to reduce residual VOCs in the final product. Low VOC paints are characterized as having volatile impurity levels of 100 ppm or less. One particularly troublesome close boiling impurity is dibutylether (bpt=140° C.) which boils close to butyl acrylate (bpt=145° C.) and has a relative volatility, $\alpha=1.20$. Purification of butylacrylate by use of traditional distillation columns today requires high capital investment and high operating costs. The method of the present invention produces a purer product in a much more efficient and cost effective manner.

Ultra high purity monomers are especially useful in manufacture of specialty polymers for applications including photo lithography and opto-electronics. In some cases, it is necessary to remove optical isomers of one monomer to get the desired polymer properties.

Furthermore, ultra high purity monomers and solvents for electronic materials applications can include a variety of organic chemicals such as substituted acrylates and methacrylates, acetone, MTBE, PGMEA, cyclohexanone, and DMF. These monomers and solvents are used in the production of photolithographic polymers and ancillary products for silicon chip fabrication for integrated circuits. Computer chip manufacturers also use a variety of solvents, chelating agents, and cleaning solutions as post-etch residue removers to wash silicon wafers during fabrication. Ultra high purity product specifications dictate the use of high purity materials in all aspects of chip processing.

The microchannel devices can further be combined with one or more other purification processes to form hybrid purification processes to bypass compositional or thermodynamic barriers in solubility or vapor-liquid equilibrium or that otherwise prevent high purity products from being attained. These include, but are not limited to, extractive distillation, azeotropic distillation, extractive crystallization, membrane permeation/distillation, reverse osmosis/distillation, reactive distillation, catalytic distillation, stripping distillation and other hybrid purification processes known to those skilled in the art.

In extractive distillation the relative volatility of the feed components is altered by addition of solvent or other added stream to selectively interact with at least one of the components to increase the relative volatility of at least one component and enable an easier separation and purification. The choice of solvent can impact whether the desired product is recovered as an overhead product or bottoms product. The choice of solvent will be dictated by the nature of the compounds to be purified and may include a range of materials such as water, organic hydrocarbons and ionic liquids. The added solvent is typically recovered in a separate solvent recovery column and recycled to the extractive distillation column. The microchannel device can be used for the extractive distillation column, the solvent recovery column, or both. Improved efficiency in separation (lower HETP) provided by the microchannel device can help overcome the limitations in purity attained by higher recycle ratio which dilutes the concentration and efficiency of the extractive solvent in conventional columns.

In azeotropic distillation a solvent is added to create or alter a compositional pinch-point with one or more of the feed components. The azeotrope produced as an overhead or bottoms product in a first column is sent to a second column where the azeotrope is broken by addition of a solvent, and the desired purified stream recovered as an enriched product. The mixed solvent/feed stream is further processed to recover and recycle the solvent to the second (azeotropic distillation) column, and reject the byproducts/impurities from the first column.

In extractive crystallization processes a solvent is added to change the relative solubility of two or more solutes to affect the crystallization process. This could include alteration of a compositional eutectic that prevents a pure phase from forming, or temperature insensitive solubility curves that prevent a pure substance from easily being separated and isolated by adjusting temperature. Distillation is used to recover and recycle the solvent to affect the solubility behavior. High efficiency microchannel distillation provides a unique way to ensure high purity solvent is present in the recycle which helps improve efficiency of the crystallization process and reduces the flow and costs associated with the solvent stream.

In membrane and/or reverse osmosis distillation hybrid purification systems a distillation column is coupled with a membrane separation device to enhance the effectiveness of the purification process. In one embodiment, the feed stream may first be processed through a membrane to concentrate the feed stream and reduce the size of the downstream distillation column. In a second embodiment, a product from the distillation column may be passed to a membrane device for a secondary purification or polishing step.

We claim:

1. A method for preparing compounds of ultra high purity comprising:

separating at least one target compound from at least one impurity compound in at least one microchannel device;

wherein the at least one target compound and at least on impurity compound have a relative volatility of less than or equal to 1.2; and further wherein the at least one target compound has a resultant purity of 99.99%.

2. The method of claim 1 wherein the at least one microchannel device is a microchannel distillation device.

3. The method of claim 1 wherein purifying in at least one microchannel device is by temperature swing adsorption.

4. The method of claim 1 further comprising at least one microchannel device that contains a wick structure.

5. The method of claim 1 wherein the microchannel device has a height equivalent theoretical plate (HETP) of less than 5 cm.

6. The method of claim 1 wherein the level of the at least one impurity is reduced to less than 100 ppm of the at least one target compound and at least one impurity compound combined.

7. The method of claim 1 wherein the at least one microchannel device is used in combination with at least one other purification process.

8. The method of claim 1 wherein the target compounds having a resultant purity of 99.99% are used in electronic materials applications.

9. The method of claim 7 wherein the target compounds having a resultant purity of 99.99% are used in electronic materials applications.

* * * * *